(12) United States Patent
Dupey

(10) Patent No.: US 10,936,665 B2
(45) Date of Patent: Mar. 2, 2021

(54) GRAPHICAL MATCH POLICY FOR IDENTIFYING DUPLICATIVE DATA

(71) Applicant: SAP SE, Walldorf (DE)

(72) Inventor: Ronald Dupey, La Crosse, WI (US)

(73) Assignee: SAP SE, Walldorf (DE)

(*) Notice: Subject to any disclaimer, the term of this patent is extended or adjusted under 35 U.S.C. 154(b) by 307 days.

(21) Appl. No.: 16/059,639

(22) Filed: Aug. 9, 2018

(65) Prior Publication Data

US 2020/0050708 A1    Feb. 13, 2020

(51) Int. Cl.
  *G06F 3/0481*    (2013.01)
  *G06F 16/17*     (2019.01)
  *G06F 16/903*    (2019.01)
  *G06F 16/9038*   (2019.01)

(52) U.S. Cl.
  CPC .... *G06F 16/90335* (2019.01); *G06F 3/04817* (2013.01); *G06F 16/1734* (2019.01); *G06F 16/9038* (2019.01)

(58) Field of Classification Search
  CPC .......... G06F 16/90335; G06F 16/1734; G06F 16/9038; G06F 3/04817; G06F 16/215; G06F 16/90344; G06F 8/34
  See application file for complete search history.

(56) References Cited

U.S. PATENT DOCUMENTS

| | | | |
|---|---|---|---|
| 6,407,753 B1 | 6/2002 | Budinsky et al. | |
| 7,562,340 B2 | 7/2009 | Kosov et al. | |
| 7,644,055 B2 | 1/2010 | Furst et al. | |
| 7,689,442 B2 | 3/2010 | Childress et al. | |
| 7,865,507 B2 | 1/2011 | Namait et al. | |
| 8,799,282 B2 | 8/2014 | Goldenberg et al. | |
| 9,229,971 B2 | 1/2016 | Woody et al. | |
| 9,330,148 B2 | 5/2016 | Dani et al. | |
| 9,336,286 B2 | 5/2016 | Woody et al. | |
| 9,348,851 B2 | 5/2016 | Kim | |
| 9,405,513 B2 | 8/2016 | Fuchs et al. | |
| 9,779,146 B2 | 10/2017 | Thatavarthy et al. | |

(Continued)

OTHER PUBLICATIONS

Configure Custom Match Rules—4.1.x Documentation, [online], [retrieved on Feb. 14, 2018] Retrieved from the Internet <URL: http://docs.appdynamics.com/display/PRO41/Configure+Custom+Match+Rules >, 3 pages.

(Continued)

*Primary Examiner* — Jorge A Casanova
(74) *Attorney, Agent, or Firm* — Sterne, Kessler, Goldstein & Fox P.L.L.C.

(57) ABSTRACT

Disclosed herein are system, method, and computer program product embodiments for providing a graphical match policy for identifying duplicative data. An embodiment operates by receiving a selection of a match rule for identifying duplicate records within a database, the match rule comprising a candidate filter and a comparison filter. One or more candidate attributes of the candidate filter and one or more comparison attributes of the comparison filter are determined. A first subset of the records within the database that satisfy the candidate filter are identified. A second subset of the records from the first subset of records that satisfy the comparison filter are identified. The second subset of records that satisfy both the candidate filter and the comparison filter are returned.

17 Claims, 4 Drawing Sheets

(56) References Cited

U.S. PATENT DOCUMENTS

| | | |
|---|---|---|
| 9,792,351 B2 | 10/2017 | Hernandez-Sherrington et al. |
| 2010/0030893 A1 | 2/2010 | Berg et al. |
| 2013/0091104 A1* | 4/2013 | Kemp ................... G06F 16/23 707/692 |
| 2015/0193511 A1* | 7/2015 | Woody ................ G06F 16/248 707/722 |
| 2015/0227542 A1* | 8/2015 | Thatavarthy .......... G06F 16/215 707/692 |
| 2015/0356186 A1* | 12/2015 | Konik ................ G06F 16/9038 707/706 |
| 2017/0351511 A1* | 12/2017 | Bar-Or ..................... G06F 8/34 |

OTHER PUBLICATIONS

Managing Duplicate Records in Salesforce, [online], Feb. 18, 2016, Retrieved from the Internet <URL: https://resources.docs.salesforce.com/200/10/en-us/sfdc/pdf/salesforce_data_quality_duplicate_prevention.pdf >, pp. 1-31.

* cited by examiner

FIG. 2

Filter

Name

Description

[ Apply ]  [ ⊗ Cancel ]

200

( BUS_TYPE = 'C'  OR  BUS_TYPE = 'P' )

AND

SALES_REG = 'APJ'

AND ( SCRIPT_CODE ≠ 'CJK'  OR  ( ORG_TYPE = 'HC'  AND  ORG_TYPE = 'QL' ))

AND

ORG_NAME (>=83)

210

GRAPHICAL MATCH POLICY FOR IDENTIFYING DUPLICATIVE DATA

BACKGROUND

Storing duplicate records in a database consumes both extra memory and disk storage space, requires extra processing resources to parse through the duplicate data, and requires extra bandwidth when returning duplicate results. Furthermore, if a query produces duplicate results, this may create confusion by a person or system requesting the data.

BRIEF DESCRIPTION OF THE DRAWINGS

The accompanying drawings are incorporated herein and form a part of the specification.

FIG. 2 illustrates an example visual interface for modifying a match rule, according to an example embodiment.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a graphical match policy for identifying duplicative data.

Figure 1:
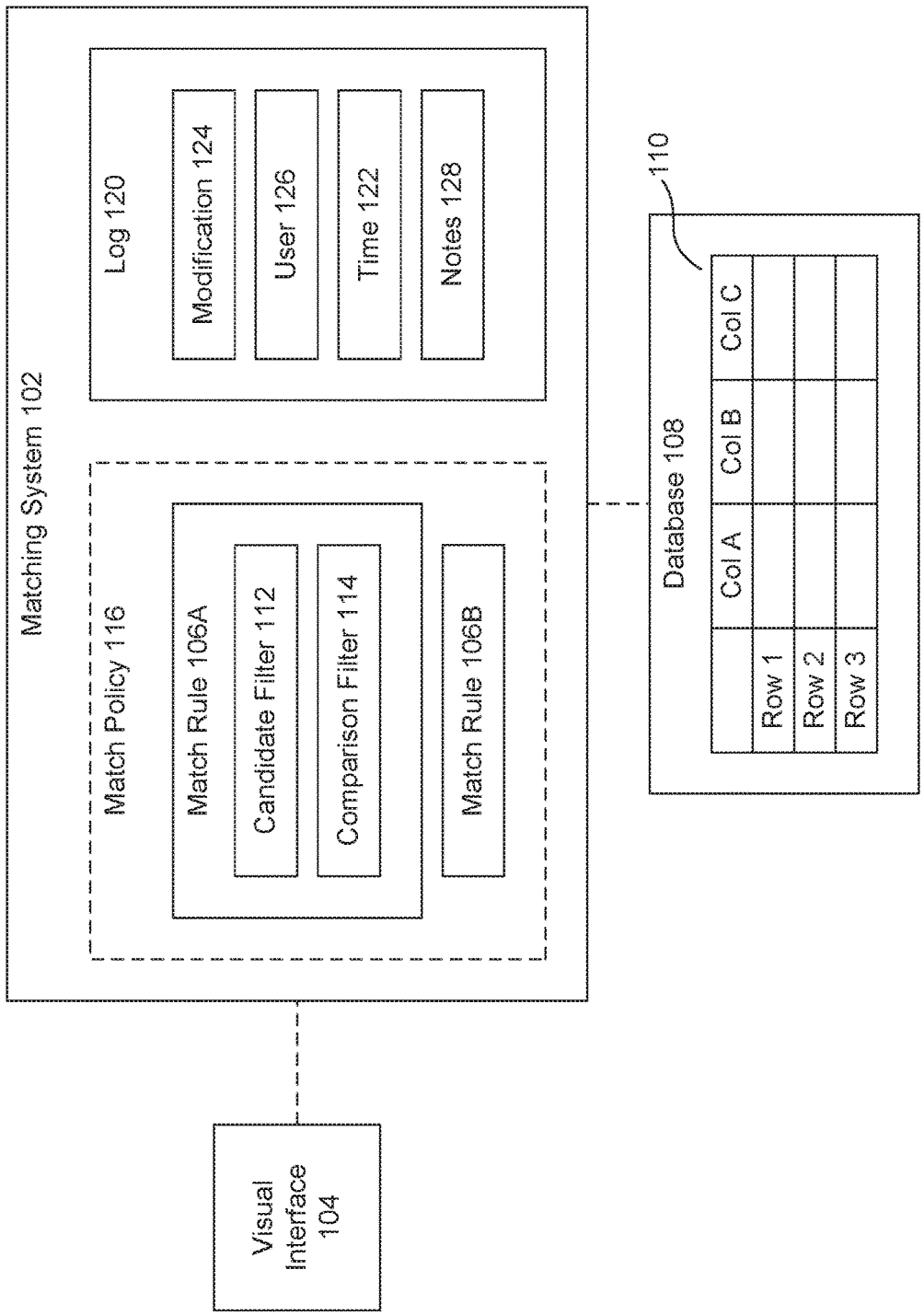
FIG. 1 is a block diagram illustrating example functionality for providing a matching system, according to some embodiments.

FIG. 1 is a block diagram 100 illustrating example functionality for providing a matching system 102, according to some embodiments. Matching system 102 may identify duplicate records in a database 108 based on a set of one or more match rules 106A, 106B.

Databases may store records, which are being modified (added, edited, and removed) by different users and systems. As a result of these ongoing modifications, some of which may occur simultaneously, databases may end up storing duplicate records. A record may be information that represents a particular object or entity (e.g., such as a row in a database 108). A duplicate record may be when a particular object is represented multiple times across multiple different rows that include similar or redundant information, within the same database 108 or table 110.

Storing and maintaining duplicate records may waste valuable computing resources and bandwidth. For example, storing duplicate records may require extra storage space within a database 108. Searching duplicate records may require extra processing power (as more records need to be searched). And returning duplicate records (as the result of a query) may consume both additional bandwidth in transmission, and additional processing cycles and memory from both sending and receiving computing devices or processors. Returning duplicate records may also cause confusion by a user or system receiving the result. Furthermore, backing up duplicate records may also consume both additional storage and processing resources.

Some matching may be simple, such as comparing a single attribute (e.g., column) between two records and determining whether the values are identical (which indicates a duplicate record). For example, product information stored in a database may include a variety of different information: names, descriptions, dimensions, compatibility, and other product information. However, in such a database, identifying a match or duplicate record may be as simple as determining whether the model number of two records is identical (which is an example of a match rule 106).

In an embodiment, matching system 102 may use or execute one or more match rules 106 to differentiate between the entries and identify duplicate or unique records. In the example above, the match rule 106 may include an identifier or attribute indicating which column (that stores model number information) is compared between records. The match rule 106 may require an identical value for the identified column in order for a match to be determined. In other embodiments, a lesser similarity indicator may be used, such as an 83% similarity between the entered values across records, in order to determine matches.

In an embodiment, match rule 106 may also indicate what action is to be taken when a match is confirmed or a duplicate is identified. For example, match rule 106 may further indicate a criteria for determining which record between two matching records is deleted (e.g., delete the oldest record) or how the records are consolidated (e.g., which information to use from which record if the information varies). In an embodiment, matching system 102 may flag the duplicates records and/or notify an administrator when one or more duplicate records have been identified across one or more tables 110 of a database 108.

In other embodiments, match rules 106 may take into account multiple attributes or columns from a table 110 to identify a duplicate. For example, identifying duplicate records within a database may be challenging because the same information (corresponding to a particular entity or object) may be represented or entered different ways by different users or systems. For example, database 108 may include an entry for a business called the Car Shop multiple times. However, the Car Shop may be entered as "Car Shop," "Car Shoppe," or even "Car Chop," across different records of database 108. As such, the match rules 106 may indicate that address, zip code, and/or phone number (as well as additional or different data) may be taken into account and compared to determine a duplicate or match.

However, it is also possible that the same information may actually correspond to or represent different entities or objects. For example, database 108 may include five entries for "Bob Smith." However, the entries may represent the same person, five different persons, or any number of different persons in between. To determine how many separate entities exist, match rules 106 may indicate that a middle name, place of birth, phone number, user ID, social security number, or other attribute information may be compared to determine which entries are duplicates.

Due to the potentially complex logic required to identify whether or not two records are duplicates, matching system 102 may provide a visual interface 104 enabling customization of the match rules 106. Matching system 102 may then execute the match rules 106, identify duplicate records, and consolidate or remove the duplicate records resulting in fewer records and saved resources. In an embodiment, matching system 102 may notify an administrator or other user that a duplicate has been identified and the user may take action (e.g., determining how to consolidate or remove the duplicates).

Some matching systems may require that a user have detailed knowledge of how matching is accomplished, such as knowing the structure of the database. Such matching systems may be both resource intensive, and require specialized knowledge by the user. However, visual interface 104 may make selecting and editing match rules 106 easier for a user. For example, rather than requiring detailed knowledge of matching systems and the structure of the database, matching system 102 may scan database 102 and provide a drag-and-drop interface 104 that enables the user to visually configure match rules 106, using other existing match rules as a basis for creating new match rules 106.

For example, rather than building a new match rule 106 from scratch, visual interface 104 may enable a user to select an existing match rule 106. Visual interface 104 may provide the user the option of editing the existing match rule 106, or copying it and editing the copy, and saving it as a new match rule 106.

One of the challenges in identifying duplicate records is that in some systems, for a duplicate record to be detected, two records must be compared to each other. However, a database may store millions of records, and comparing each record or every other record in order to identify if any duplicates exist amongst the millions of records may consume massive amounts of computing resources which may interfere with the operations of the database.

Matching system 102 may alleviate this resource consumption issue, by using a candidate filter 112. In an embodiment, a match rule 106 may include two parts: a candidate filter 112 and a comparison filter 114. Candidate filter 112 may include one or more rules or expressions that may be evaluated using the properties of a single row or record (e.g., rather than comparing two records to each other). Evaluating the values of a single record against the criteria of candidate filter 112 may consume fewer processing resources than retrieving and comparing the values of two records against each other.

In an embodiment, the evaluation of a record against candidate filter 112 may result in either a Boolean (0/1) or True/False result. The result may indicate whether or not the record satisfies the criteria and is a candidate record. Matching system 102 may identify a subset of candidate records from one or more tables 110 of database 108 that satisfy the criteria of candidate filter 112.

From the set of candidate records (e.g., which evaluate to True against candidate filter 112), matching system 102 may then apply a comparison filter 114 in which each of the candidate records are compared to one or more other of the candidate records in order to identify a duplicate record. Matching system 102 can save valuable computing cycles by applying a candidate filter 112 prior to evaluating the comparison filter 114, and performing comparisons between records on a smaller subset of the records of database 108 than may otherwise be required (e.g., without candidate filter 112).

In an embodiment, comparison filter 114 may include a similarity threshold, similarity measure, or similarity requirement that indicates how similar values (from two different records) must be, in order to be considered duplicate records or duplicate values. In an embodiment, the similarity threshold may indicate a percentage (e.g., 50%, 85%, 100%, etc.) between values that matching system 102 evaluates between two records. For example, if similarity threshold is 60%, a comparison between "Sam" and "Sammy" would satisfy the threshold and be considered a match (e.g., 3/5=60%).

Or, for example, similarity threshold may indicate that the first character, the third character, and/or the last character in a value must be the same, or that the values of the attributes must be the same length. In an embodiment, the similarity threshold may include a range of acceptable values. For example, if at least one or both (or neither) of the records includes the values 3, 5, or 8, or if the values fall within the range of 0-100, then the particular similarity rule may be satisfied. Using visual interface 104, a user may set and configure similarity thresholds for the comparison filters 114 across one or more match rules 106 and policies 116.

In an embodiment, the various attributes of the filters 112, 114 may be weighted. For example, comparison filter 112 may indicate that the values of column A, B, and C of row 1 and row 2 (of table 110) are to be compared to each other. The criteria for column A may include a weight of 0.5, while the criteria for columns B and C may each include a weight of 0.25. Comparison filter 114 may indicate a threshold of 0.75 for two records to be duplicates. If rows 1 and 2 meet the criteria of column A, and at least one of column B or C, then the rows may be duplicates under the weighted comparison filter 114.

In an embodiment, a comparison filter 114 may compare a first attribute or column from a record or row from a first table 110 to a second attribute or column from a record from a second table 110. For example, the first name attribute of a first record may be compared against a last name attribute of a second record.

In an embodiment, matching system 102 may generate a score from applying comparison filter 114 between two or more records. If the score exceeds a particular threshold, then a match may be determined between the records. The scoring may take into consideration any different number of attributes or criteria. In different embodiments, the scoring may account for how to score missing values in the attributes of one or more of the records, how to score for transposed letters, and how to score abbreviations of compared values (e.g., California in one record v. CA in another record).

A match policy 116 may include a set of one or more related match rules 106 that are applied to a particular database 108. For example, database 108 may include four different tables 110. In an embodiment, each table 110 may include its own match rule 106. The group of match rules 106 may be stored together as a match policy 116.

In an embodiment, matching system 102 may perform multi-level matching and updating. Matching system 102 may organize matching into levels. For example, a higher level match policy 116 may include one or more lower level match rules 106. Below that, a higher level match rule 106 may include a lower level candidate filter 112 and a lower level comparison filter 114.

In an embodiment, visual interface 104 may enable changes to a lower level matching structure to be propagated to one or more higher level matching structures. For example, a modification to a lower-level object (such as a candidate filter 112 or comparison filter 114) may be applied to a particular set of higher-level objects (such as one or more match rules 106 or match policies 116 that reference the lower level filter 112, 114).

In an embodiment, different match policies 116 may each reference the same match rule 106B. Then, for example, if the particular match rule 106B is modified, visual interface 104 may provide a user with the option of selecting to which match policies 116 the modified match rule 106B is applied, and which match policies 116 will continue using the previous (unmodified) match rule 106B. Similarly, changes to a candidate filter 112 or comparison filter 114 may be selectively applied to one or more match rules 106 or match policies 116 that reference the modified filter 112, 114. Matching system 102, via visual interface 104, may enable a user to select to which high-level objects (e.g., match rules 106, match policies 116) a filter 112, 114 change is propagated or implemented.

In an embodiment, matching system 102 may track updates to match policies 116, match rules 106, candidate filters 112, and comparison filters 114 in a log 120. Log 120 may include a record indicating a date and time 122 about when a modification 124 (adding, deleting, or updating any of match policy 116, match rule 106, or filters 112, 114) was made. Log 120 may also include a user ID or other user identity information 126. In an embodiment, the user making the change may also add notes 128 to the log 120 using visual interface 104.

For example, when a user accesses match rule 106A through visual interface 104, and updates comparison filter 114, matching system 102 may record the user ID 126, date and time 122, and the type of modification that was made in log 120. Matching system 102 may further prompt the user to enter notes 128 that provide a rationale behind the change. In an embodiment, log 120 may be used to roll back prior changes, or to copy them to new matching objects.

FIG. 2 illustrates an example visual interface 200 for modifying a match rule 106, according to an example embodiment. In an embodiment, a user may use visual interface 104 to add, modify, or delete a candidate filter 112 or comparison filter 114. Visual interface 104 may also allow users to determine to which upper-level objects the changes are propagated, and matching system 102 may track any changes and propagations in log 120.

As illustrated in visual interface 200 (which may correspond to visual interface 104 of FIG. 1), a user may enter a name and description for the filter (which may be either a candidate filer 112 or a comparison filter 114). The filter may include criteria 210 which may be a definition including one or more rules or tests that enable matching system 102 to determine whether or not a record from database 108 is a candidate record, or whether a candidate record is a duplicate record.

The tests may include references to one or more columns from one or more tables 110 of database 108. For example, "bus_type" may correspond to a field or column from database 108, and if the bus_type is equal to "C" or "P" then the record may pass the test and move on to the next test for "sales_reg." In a candidate filter 112 or comparison filter 112, the result of each test may evaluate to T/F or be scored (and may need to exceed a particular scoring threshold to pass the filter test).

As illustrated in the example criteria 210, the rule for "org_name" may indicate that the "org_name" between two records must be greater than or equal to an 83% similarity criteria (e.g., in a comparison filter 114). These tests may evaluate to T/F (that is, true/false). In an embodiment, visual interface 200 may enable a user to select from a drop down list, check boxes, or drag and drop components into tests and rules without having knowledge of the schema of database 108.

In other embodiments, a comparison filter 114 may indicate a relationship between the attributes of two records. For example, the rules of criteria 210 may indicate whether both of the records must pass the test, at least one of the records must pass the test, or whether neither of the records must pass the test.

Figure 3:
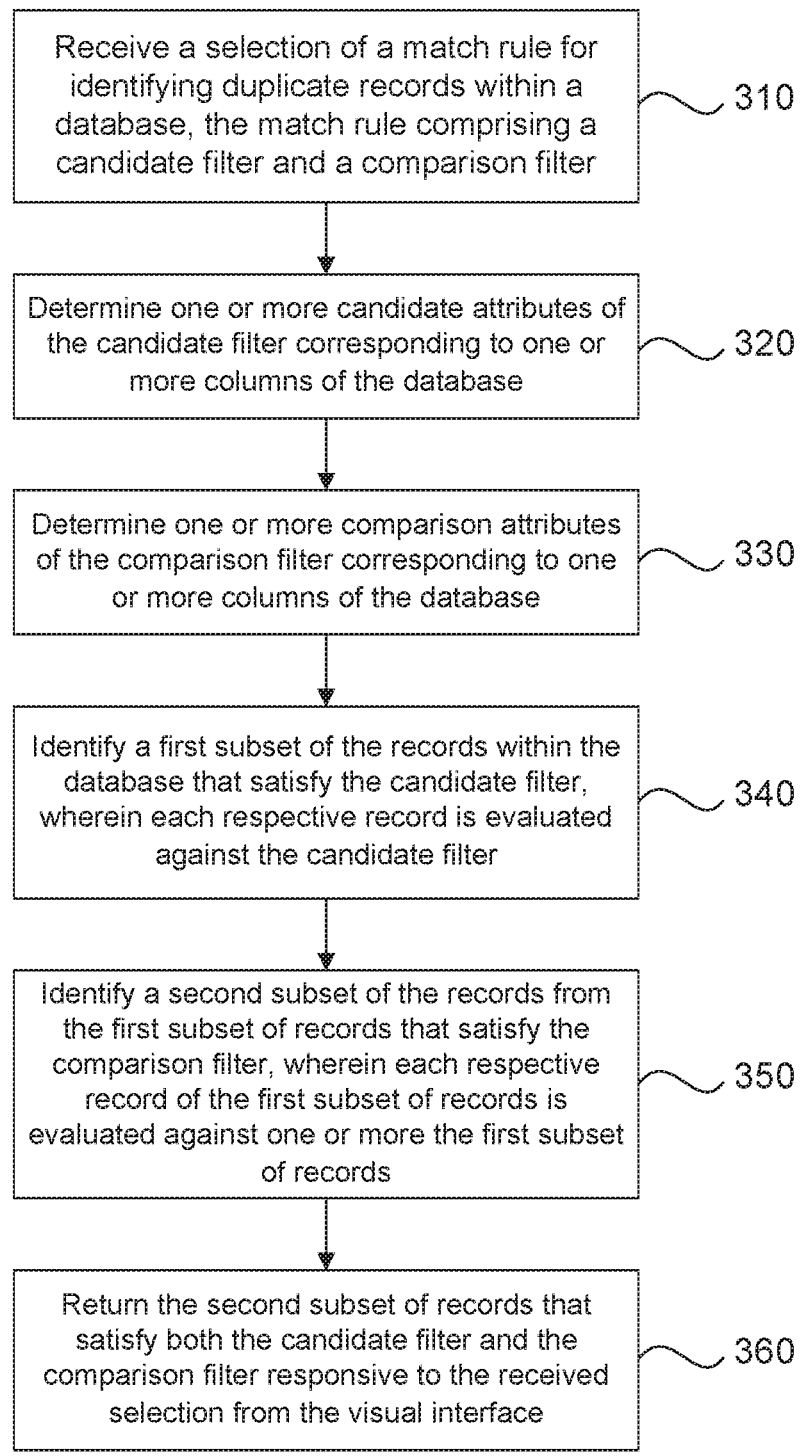
FIG. 3 is a flowchart illustrating example operations of a matching system, according to some embodiments.

FIG. 3 is a flowchart 300 illustrating example operations of a matching system 102, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIGS. 1 and 2. However, method 300 is not limited to the example embodiments.

In 310, a selection of a match rule for identifying duplicate records within a database is received from a visual interface. The match rule may include a candidate filter and a comparison filter. For example, matching system 102 may receive a selection of match rule 106A from visual interface 104. Match rule 106A may include candidate filter 112 and comparison filter 114.

In 320, one or more candidate attributes of the candidate filter corresponding to one or more columns of the database are determined. For example, as illustrated in criteria 210 of FIG. 2, candidate filter 112 may include a number of rules indicating which attributes or columns of table 110 must pass which criteria to satisfy the filter 112. In an embodiment, visual interface 104 may include an option modifying the candidate filter 112.

In 330, one or more comparison attributes of the comparison filter corresponding to one or more columns of the database are determined. For example, as illustrated in criteria 210 of FIG. 2, comparison filter 114 may include a number of rules indicating which attributes or columns of table 110 must pass which criteria to satisfy the filter 114. In an embodiment, visual interface 104 may include an option modifying the comparison filter 114. In an embodiment, both the candidate filter 112 and comparison filter 114 may include the same rules or criteria 210.

In 340, a first subset of the records within the database that satisfy the candidate filter is identified. For example, matching system 102 may apply the candidate filter 112 to all (or a selected number) of the records of database 108 (or a particular table 110).

In 350, a second subset of the records from the first subset of records that satisfy the comparison filter is identified. For example, matching system 102 may apply comparison filter 114 between various identified candidate records (e.g., that satisfy the candidate filter 112) to identify duplicate records.

In 360, the second subset of records that satisfy both the candidate filter and the comparison filter is returned responsive to the received selection from the visual interface. For example, the records of database 108 that satisfy one or more matching rules 106 of a matching policy 116 may be identified as duplicate records. In an embodiment, matching system 102 may delete duplicate records, or may notify an administrator which records are duplicates so that corrective action may be taken.

Figure 4:
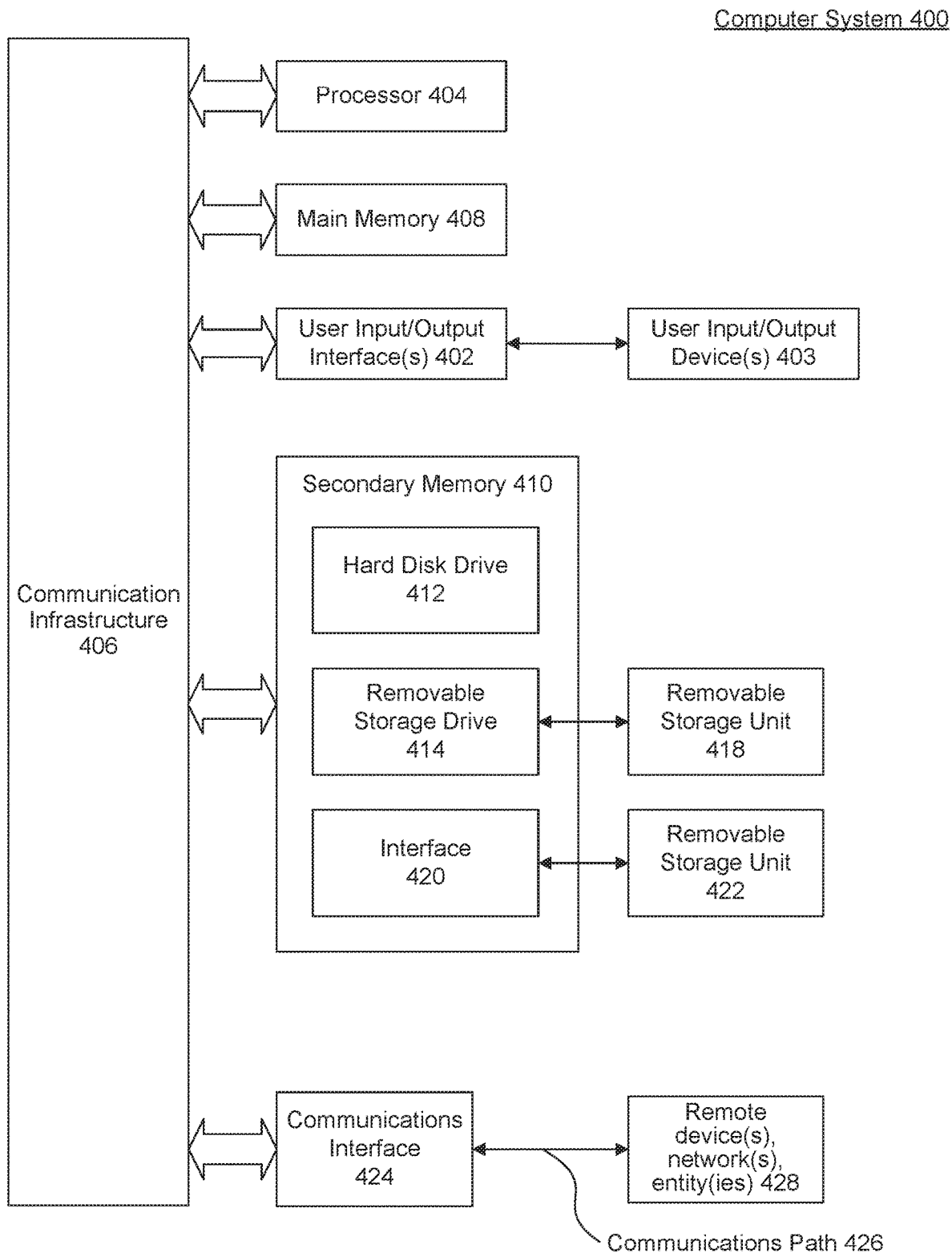
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/output device(s) 403, such as monitors, keyboards, pointing devices, etc., which may communicate with communication infrastructure 406 through customer input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
    receiving, from a visual interface, a selection of a first match rule for identifying duplicate records within a database, the first match rule comprising a candidate filter and a comparison filter;
    determining one or more candidate attributes of the candidate filter corresponding to one or more columns of the database, wherein the visual interface provides an option for modifying the candidate filter;
    determining one or more comparison attributes of the comparison filter corresponding to one or more columns of the database, wherein the visual interface provides an option for modifying the comparison filter;
    identifying a first subset of the records within the database that satisfy the candidate filter, wherein each respective record is evaluated against the candidate filter;
    identifying a second subset of the records from the first subset of records that satisfy the comparison filter, wherein each respective record of the first subset of records is evaluated against one or more other records of the first subset of records;
    returning, responsive to the received selection from the visual interface, the second subset of records that satisfy both the candidate filter and the comparison filter;
    receiving, via the visual interface, a modification to the comparison filter;
    determining a second match rule that references the comparison filter; and
    providing, via the visual interface, an option to include the modification on the second match rule.

2. The method of claim 1, wherein the identifying the first subset of records comprises:
    determining a first candidate filter and a second candidate filter; and
    grouping one or more of the first subset of records into a first group of records that satisfy the first candidate filter; and
    grouping one or more of the first subset of records into a second group of records that satisfy the second candidate filter.

3. The method of claim 1, further comprising:
    recording, in a log, a date, time, and user account associated with the modification; and
    prompting, via the visual interface, an option for a user to enter notes regarding the modification.

4. The method of claim 1, wherein the receiving the modification comprises:
    receiving a selection of the option; and
    displaying, via the visual interface and responsive to the selection of the option, one or more selectable icons representing one or more columns of the database, wherein a selected icon modifies an attribute of the comparison filter, and wherein the modification comprises a selection of one more of the icons.

5. The method of claim 1, further comprising:
    receiving, via the visual interface, a modification to the candidate filter;
    determining a third match rule that references the candidate filter; and
    providing, via the visual interface, an option to include the modification on the third match rule.

6. The method of claim 1, wherein the identifying the second subset of records comprises: identifying two records from the first subset of records that are duplicate records.

7. The method of claim 6, wherein the returning comprises:
    removing, from the database, at least one of the duplicate records; and
    returning an indication as to which duplicate record was removed.

8. A system comprising:
    a memory; and
    at least one processor coupled to the memory and configured to:
        receive, from a visual interface, a selection of a first match rule for identifying duplicate records within a database, the first match rule comprising a candidate filter and a comparison filter;
        determine one or more candidate attributes of the candidate filter corresponding to one or more columns of the database, wherein the visual interface provides an option for modifying the candidate filter;
        determine one or more comparison attributes of the comparison filter corresponding to one or more columns of the database, wherein the visual interface provides an option for modifying the comparison filter;
        identify a first subset of the records within the database that satisfy the candidate filter, wherein each respective record is evaluated against the candidate filter;
        identify a second subset of the records from the first subset of records that satisfy the comparison filter, wherein each respective record of the first subset of records is evaluated against one or more other records of the first subset of records;
        return, responsive to the received selection from the visual interface, the second subset of records that satisfy both the candidate filter and the comparison filter;
        receive, via the visual interface, a modification to the comparison filter;
        determine a second match rule that references the comparison filter; and provide, via the visual interface, an option to include the modification on the second match rule.

9. The system of claim 8, wherein the at least one processor that identifies the first subset of records is configured to:
determine a first candidate filter and a second candidate filter; and
group one or more of the first subset of records into a first group of records that satisfy the first candidate filter; and
group one or more of the first subset of records into a second group of records that satisfy the second candidate filter.

10. The system of claim 8, wherein the at least one processor is further configured to:
record, in a log, a date, time, and user account associated with the modification; and
prompt, via the visual interface, an option for a user to enter notes regarding the modification.

11. The system of claim 8, wherein the at least one processor that receives the modification is configured to:
receive a selection of the option; and
display, via the visual interface and responsive to the selection of the option, one or more selectable icons representing one or more columns of the database, wherein a selected icon modifies an attribute of the comparison filter, and wherein the modification comprises a selection of one more of the icons.

12. The system of claim 8, wherein the at least one processor is further configured to:
receive, via the visual interface, a modification to the candidate filter;
determine a second match rule that references the candidate filter; and
provide, via the visual interface, an option to include the modification on the second match rule.

13. The system of claim 8, wherein identifying the second subset of records comprises:
identifying two records from the first subset of records that are duplicate records.

14. The system of claim 13, wherein the at least one processor that returns the second subset of records is configured to:
remove, from the database, at least one of the duplicate records; and
return an indication as to which duplicate record was removed.

15. A non-transitory computer-readable device having instructions stored thereon that, when executed by at least one computing device, cause the at least one computing device to perform operations comprising:
receiving, from a visual interface, a selection of a first match rule for identifying duplicate records within a database, the first match rule comprising a candidate filter and a comparison filter;
determining one or more candidate attributes of the candidate filter corresponding to one or more columns of the database, wherein the visual interface provides an option for modifying the candidate filter;
determining one or more comparison attributes of the comparison filter corresponding to one or more columns of the database, wherein the visual interface provides an option for modifying the comparison filter;
identifying a first subset of the records within the database that satisfy the candidate filter, wherein each respective record is evaluated against the candidate filter;
identifying a second subset of the records from the first subset of records that satisfy the comparison filter, wherein each respective record of the first subset of records is evaluated against one or more other records of the first subset of records;
returning, responsive to the received selection from the visual interface, the second subset of records that satisfy both the candidate filter and the comparison filter;
receiving, via the visual interface, a modification to the comparison filter;
determining a second match rule that references the comparison filter; and
providing, via the visual interface, an option to include the modification on the second match rule.

16. The non-transitory computer-readable device of claim 15, wherein the identifying the first subset of records comprises:
determining a first candidate filter and a second candidate filter; and
grouping one or more of the first subset of records into a first group of records that satisfy the first candidate filter; and
grouping one or more of the first subset of records into a second group of records that satisfy the second candidate filter.

17. The non-transitory computer-readable device of claim 15, wherein the device is further configured to perform operations comprising:
recording, in a log, a date, time, and user account associated with the modification; and
prompting, via the visual interface, an option for a user to enter notes regarding the modification.

* * * * *